(12) United States Patent
Kelly

(10) Patent No.: US 7,124,832 B2
(45) Date of Patent: Oct. 24, 2006

(54) METHOD AND APPARATUS FOR IN SITU AND MOLDED HORSESHOEING

(76) Inventor: Casey Kelly, P.O. Box 4536, Paso Robles, CA (US) 93447

( * ) Notice: Subject to any disclaimer, the term of this patent is extended or adjusted under 35 U.S.C. 154(b) by 0 days.

(21) Appl. No.: 10/719,864

(22) Filed: Nov. 20, 2003

(65) Prior Publication Data

US 2005/0121205 A1   Jun. 9, 2005

(51) Int. Cl.
  *A01L 1/02*      (2006.01)
  *A01L 5/00*      (2006.01)
(52) U.S. Cl. .................................... 168/4; 168/DIG. 1
(58) Field of Classification Search .................. 168/24, 168/48.1, 4, 17, DIG. 1; 606/212
  See application file for complete search history.

(56) References Cited

U.S. PATENT DOCUMENTS

| 3,285,346 | A | * | 11/1966 | Jenny et al. | 168/4 |
| 4,237,981 | A | * | 12/1980 | Stubbe | 168/4 |
| 4,765,411 | A | * | 8/1988 | Tennant | 168/4 |
| 4,982,797 | A | * | 1/1991 | Monticello | 168/4 |
| 5,199,498 | A | * | 4/1993 | Knudsen | 168/28 |
| 5,681,350 | A | * | 10/1997 | Stovall | 606/212 |
| 6,497,292 | B1 | * | 12/2002 | Rovelli | 168/4 |
| 6,505,686 | B1 | * | 1/2003 | Rovelli | 168/45 |

\* cited by examiner

*Primary Examiner*—Robert P. Swiatek
(74) *Attorney, Agent, or Firm*—Thomas F. Lebens; Sinsheimer Juhnke Lebens & McIvor LLP

(57) ABSTRACT

Methods, devices, and formulations for making and using synthetic hoof shoes, repairing an animal's hooves, and/or providing prophylactic measures for protecting an animal's hooves. In general a synthetic material is applied either in situ to the hoof area of a hoofed animal or is used to produce a pre-molded shoe to be attached to the hoof area of a hoofed animal.

3 Claims, 5 Drawing Sheets

METHOD AND APPARATUS FOR IN SITU AND MOLDED HORSESHOEING

RELATED APPLICATIONS

This application is related to and expressly incorporates by reference U.S. Pat. No. 6,497,292 entitled "IN SITU HORSESHOEING," U.S. Pat. No. 6,505,686 entitled "IN SITU HORSESHOEING."

BACKGROUND OF THE INVENTION

1. Field of the Invention

This application relates generally to the field of hoof shoes. More specifically the application describes methods and apparatus for building a hoof shoe in situ on the hoof of an animal as well as methods of making and devices for attaching a molded shoe to the hoof area of a hoofed animal.

2. Discussion of the Related Art

It is well known in the art that owners of hoofed animals often shod their animals in order to protect the underside of the hoof. Excessive hoof wear can cause lameness in any hoofed animal.

Conventionally metal, pre-fabricated shoes are attached to hoofed animals, such as horses, by nails or screws which are nailed or screwed into the hoof wall (i.e. the horny casing). Disadvantageously, this methos causes damage to the hoof of the animal and may allow bacteria to penetrate the hoof area. From time to time, such shoes may become loose, come off, and in many cases, cause damage to the animal's hoof where the shoe was attached as pieces of the hoof wall are broken off. Furthermore, shod animals have been known to throw shoes off and/or rip shoes off thereby causing trauma to the hoof area.

Thus, it is an object of the preferred embodiments described herein to meet these and other needs.

SUMMARY OF THE INVENTION

Described herein are methods, devices, and formulations for making and using synthetic hoof shoes, repairing an animal's hooves, and/or providing prophylactic measures for protecting an animal's hooves. In general a synthetic material is applied either in situ to the hoof area of a hoofed animal or is used to produce a pre-molded shoe to be attached to the hoof area of a hoofed animal.

In one embodiment various formulations are applied directly to an animal hoofs (i.e. in situ). In this case, the hoof shoe material may be dispensed using, for example, a hand-held dispensing gun or another type of tool, such as a trowel. A damming device may be utilized to keep the flowable hoof shoe material on the hoof of the animal until the material has cured. Following cure, the material may be shaped by way of known tools, such as a rasp, to create a custom shoe.

In another embodiment hoof shoe material is dispensed into a mold or dispensed free-form into a shape resembling a hoof shoe, hoof block, and/or horseshoe. In this case, an adhesive, or other means, is used to attach the shoe to the animal's natural hoof material or horny tissue Following application of the in situ material or pre-molded shoe to the animal hoof, the shoe material may be further shaped with known tools, such as a rasp.

In another embodiment, materials, such as resins and urethanes, are described which may be utilized for repair. These materials preferentially form quick, strong bonds to the animal's natural hoof material.

In another embodiment, materials, such as resins and urethanes, may be used to provide protection to animal hoofs. For example, any number of the resins, urethanes, and other materials described herein may be used to coat animals' hooves for prophylactic protection.

BRIEF DESCRIPTION OF THE DRAWINGS

The above mentioned and other objects and features of the preferred embodiment and the manner of attaining them will become apparent, and the invention itself will be best understood by reference to the following description of the embodiment of the invention in conjunction with the accompanying drawings, wherein.

DETAILED DESCRIPTION OF THE PREFERRED EMBODIMENT

Figures 1, 1A:
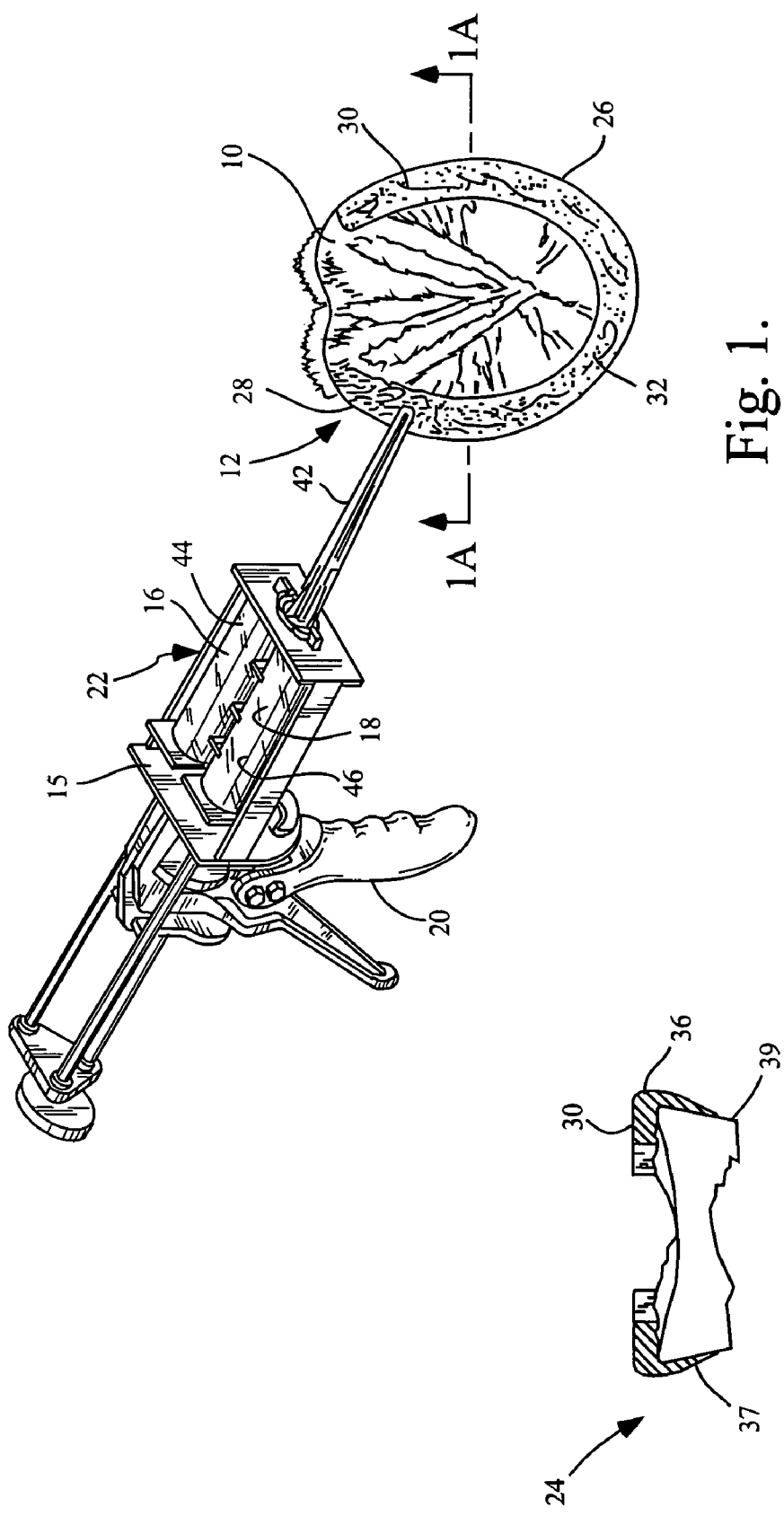
FIG. 1 is an oblique view of the extrusion application of a flowable curable resin mixture horseshoe preform onto a hoof surface from an applicator gun.
FIG. 1A is taken on line 1A—1A in FIG. 1.
Figures 2, 2A:
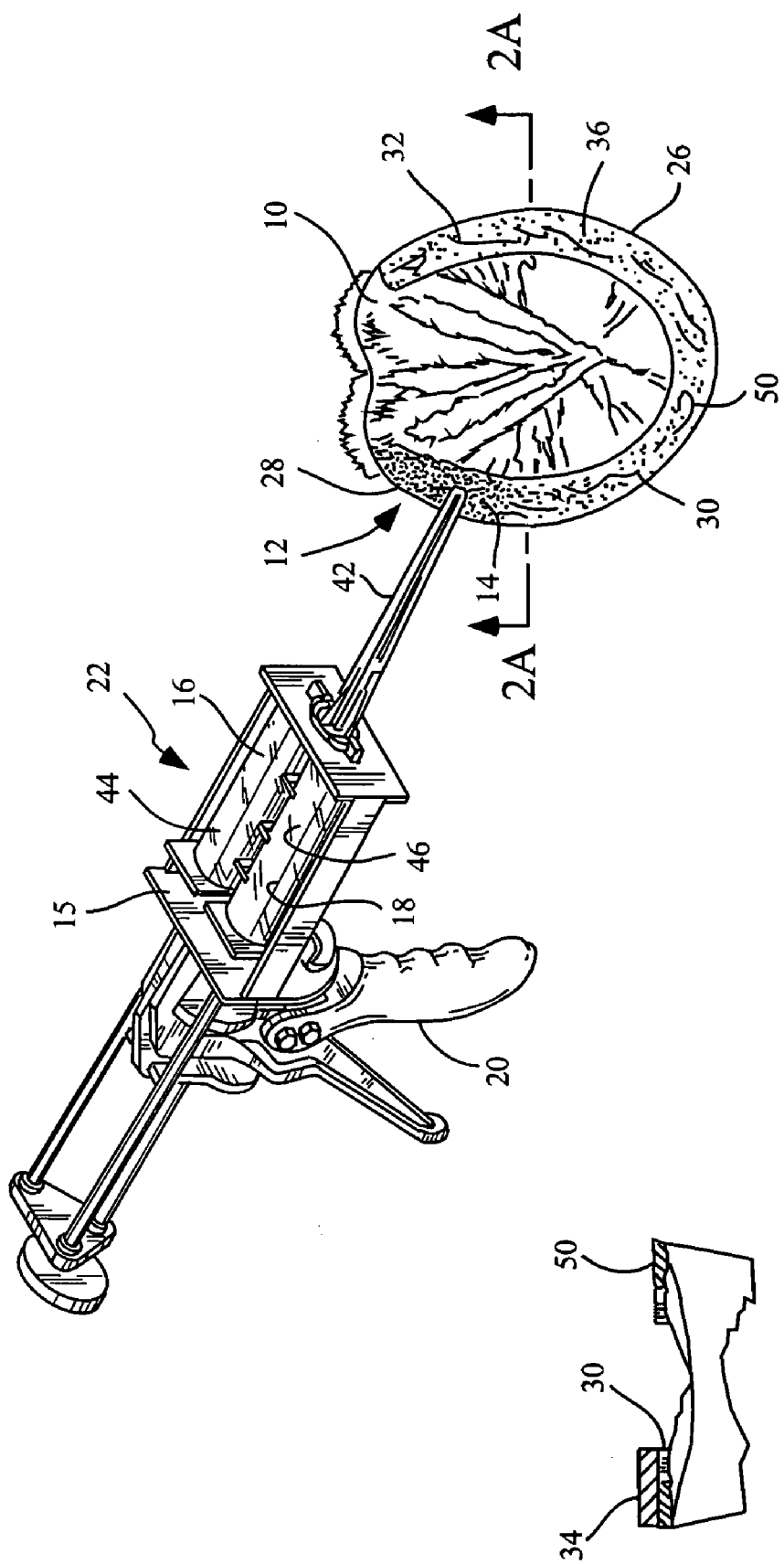
FIG. 2 is a view like FIG. 1 of the application of a precoating of resin in advance of a full profile application.
FIG. 2A is taken on line 2A—2A in FIG. 2.

The following description is the best mode presently contemplated for practicing the invention. This description is not to be taken in a limiting sense, but is made merely for the purpose of describing the general principles of the invention. The scope of the invention should be ascertained with reference to the issued claims. In the description that follows, like numeral or reference characters will be used to refer to like parts or elements throughout.

Described herein are methods, devices, and formulations for making and using synthetic hoof shoes, repairing an animal's hooves, and/or providing prophylactic measures for protecting an animal's hooves. In general a synthetic material is applied either in situ to the hoof area of a hoofed animal or is used to produce a pre-molded shoe to be attached to the hoof area of a hoofed animal.

In either case, i.e. in situ application or pre-molded application, the hoof area is first prepared. Preparation will vary depending on the needs of the animal. For example, the hoof area may require cleaning, removal of debris, application of medication, trimming, rasping, nipping, and/or clenching.

In the case of in situ application, following preparation of the hoof area, a synthetic material, such as, for example, a urethane or resin formulation is applied to the hoof area of the hoofed animal. Depending on the needs of the animal, the synthetic material may be applied to the horny casing portion, the frog portion, the sole portion and/or any other portion of the animal's foot. The specific formulation of the material applied may be adjusted depending on the needs of the animal. For example, in the case of an animal requiring hoofwall and/or crack restoration, the material will advantageously form a quick, strong bond to the hoof material and may be rigid, semi-rigid, or flexible. In the case of shock absorbent packing, the material will advantageously adhere to the sole of the animal and have a pencil eraser-like consistency to absorb shock. In any case, the applied material is supported, such as with a dam, until cured. Following curing of the synthetic material, the hardened synthetic material is shaped (if required) depending on the needs of the animal.

Following cleaning in the preformed mold application for hoofed animals, a synthetic material, such as resin or urethane, is dispensed into a mold or dispensed free-form into a shape resembling a hoof shoe, hoof block, and/or horseshoe (although the shoe may be for any type of hoofed animal). In the case of a hoof block, an animal suffering from, for example, a crushed heel may benefit from a pre-molded block which may be used to elevate the crushed portion of the heel. As in the case of the in situ application, certain variables such as described hereinabove will be dependent on the needs of the animal. Molded synthetic hoof shoes may be secured to the foot of an animal by any means such as an adhesive, nails, clips, screws, and the like. An adhesive used in conjunction with the molded synthetic hoof shoe may be any of the materials described hereinbelow for in situ hoof shoes and/or any other material useful for securing a molded shoe to the hoof area of an animal.

The in situ applications and devices described herein may be used separately or in conjunction with the molded hoof shoes described herein. Likewise the molded hoof shoes described herein may be used separately or in conjunction with the in situ applications and devices described herein.

Numerous types of formulations, methods, and devices are envisioned for various situations. Importantly, the numerous formulations, methods, and devices described herein may be used interchangeably as desired to create a custom device for any hoofed or clawed animal, depending on the needs of the animal therein. For example, the same material that may be used to produce in situ hoof shoes may be used to produce pre-molded hoof shoes. Likewise the material used to fix a damaged hoof may also be used to prophylactically treat a healthy hoof. By way of example, several of the formulations are described herein below:

In one embodiment, restorative treatment for hoofwall damage and/or crack repair may be addressed with the application of a urethane material. The urethane treatment advantageously forms a quick, strong bond to the animal's natural hoof material. The urethane material will harden in approximately 2–3 minutes, and more specifically the material will set in 45 seconds to 1 minute and cure in 2 to 3 minutes, after which time the animal may bear its full weight on the repaired hoof. After 10 to 15 minutes (depending on the ambient temperature) the solidified urethane material may be nailed, rasped, nipped, and/or clenched just like a natural hoof. For quick an easy repair, this type of restorative treatment does not require wrapping or mesh. The urethane formulation is advantageously non-toxic, semi-rigid, and comes in several colors (such as, for example, black and beige). Additionally, the urethane formulation does not produce fumes or odors such that the material may be safely applied in closed areas. The urethane material may be stored at cold or warm temperatures.

The restorative urethane formulation is comprised of two parts. In a preferred embodiment each of the two-parts is stored in one chamber of a dual chambered cartridge. In a preferred embodiment, the restorative urethane formulation in the dual chambered cartridge is applied to a hoof by inserting the dual chambered cartridge into a dispensing gun applicator. The handle of the applicator is depressed which pushes the individual urethane parts out of the respective chambers into a mixing tip having, for example, baffles arranged to cut and recombine the mixing materials as they progress through the mix tip (for examples of dispensing apparatuses see FIGS. 1–4). The resulting urethane formulation is applied to damaged areas of the hoofwall and/or cracks in the hoofwall.

In yet another embodiment, the restorative and crack restorative urethane material may be used to build a hoof shoe on an animal in situ, i.e. the material as described herein may be applied directly to the animal's hoof and shaped accordingly to form a shoe. For example, a bead of the urethane material may be applied around the outer edge of the hoof. After the material is sufficiently dry, the urethane material may be shaped by, for example, trimming, rasping, nipping, and/or clenching to form a custom shoe for the animal.

In another embodiment, instant shock absorbent hoof packing material is provided for improved protection and comfort for the feet of hoofed animals. The shock absorbent hoof packing material is particularly useful on animals with traumatized short sore feet, thin-soled feet with thin walls, chronic or acute laminitis cases and animals that work on hard surfaces.

The packing material as dispensed (and before cured) is generally the consistency of syrup and, therefore, advantageously flows to all edges of the sole for complete coverage. The packing material sets in approximately 25 to 30 seconds and, when cured, has the firmness similar to a pencil eraser. The packing material advantageously adheres tightly to the sole and pad of the animal, so there is no migration of foreign material under the pad. However, the packing material may be used without a pad. The packing material remains flexible and supportive of the frog and eliminates sweating (which is not detrimental to the frog). The packing material is advantageously non-toxic and does not produce odors.

In preparation for using the instant shock absorbent hoof packing material, the foot should be trimmed normally with minimal sole pressure. Additionally, the bars should be flush with the sole. Any material that is trapped under the bars should be removed to avoid abscessing. In the case of feet with active thrush in the medial or lateral sulcus, the area should be thoroughly cleaned. Examples of suitable cleaning materials include alcohol and or any other quickly evaporating solvent. Then a strong liquid antibacterial thrush medicine should be applied topically to dry the area. With regard to feet with active thrush deep in the central sulcus, the sulcus may be packed with copper sulfate powder, covered with a cotton ball and then the liquid packing materials may be applied normally.

When applying packing material under a pad, the mixing tip should be inserted between the hoof and the pad while pushing the end of the tip to the front of the foot. Filling should begin at the frog of the foot and as the area fills, the tip may be withdrawn until the void is completely filled. In order to completely fill the area over the frog at the rear of the pad, a dam can be made at both sides of the heels to contain the material until it sets. Examples of damming material include Play Dough (especially useful in cold weather), modeling clay (especially useful in warm weather), and duct tape.

On feet with crushed heels, it may be difficult to insert the mixing tip under the pad at the rear of the foot. In this case, a ⅜-inch hole may be drilled in the center of the pad such that the mixing tip may be directed through the hole until the material is flowing out the rear of the foot. The liquid should be kept moving steadily through the mixing tip to prevent it from setting up in the tip and obstructing flow.

When applying packing material without a pad, the foot should be prepared as usual, making sure the foot is clean and dry. Then, the shoe may be shaped as in a normal application. Gutter-guard screen may be optionally used to reinforce the liquid hoof packing material and to aid in retaining the material in the foot during hard use. Gutter-guard screen is particularly advantageous in humid climates; however, any type of mesh may be utilized. To use gutter-guard screen, cut two plies of ¼-inch mesh. gutter-guard screen into the shape of a regular pad. Rivet the screens to each heel using #10 rivets. In any case, nail the shoe to the foot and clinch the nails. Then place a six-inch length of duct tape across the rear part of the foot from heel to heel to prevent the liquid hoof material from running out the back of the foot. Fill the sole cavity with the liquid to ⅛-inch above the screen; however, more may be used. The material will be completely cured in 15-minutes (although the material is weight bearing after 25 seconds to 1 minute).

In yet another embodiment a material is provided which vastly enhances hoofwall and heel growth by sharing the load with the sole. This non-toxic self-leveling liquid urethane is poured in to the sole area of the hoof to create pad material that levels out flush to the ground or ⅛ inch below shoe surface. The material advantageously adheres to the sole thereby sealing out moisture and debris, stops heels from contracting, allows for faster thicker hoofwall and sole growth, and takes pressure off wall cracks. Furthermore, the material allows for less wear on shoes allowing multiple resets and stabilizes shoes because nail holes are not utilized. The material is preferentially used without a pad.

In another embodiment, a material is specially formulated for use when an animal is stalled or experiencing a period of low activity. The material is especially useful in these situations because it expands after dispensing through mix tip, is lightweight and supportive, and excellent when used with a hospital plate.

Turning now to the drawings, depicted in FIG. 1 is an oblique view of the extrusion application of a flowable curable resin mixture horseshoe preform onto a hoof surface from an applicator gun and FIG. 1A is taken on line 1A—1A in FIG. 1. Shown are a hoof 10, shoe 12, mixture of reactive resin components 14, applicator 15, dual chambers 16 and 18, hand grip 20 dispenser 22, intended shape 24, hoof surface 26, shoe area 28, profile 30, shoe preform 32, non-flowable mass 36, skirt 37, adjacent hoof areas 39, mix tip 42, and separate reactive resin precursors 44 and 46.

The hoof 10 has a surface 26 defining a shoe area 28. Shoe area 28 is provided with a shoe 12 formed immediately on the hoof, i.e. in situ, from a mixture of reactive resin components 14 delivered from dual chambers 16, 18 of the dispenser 22 carried in applicator 15 that delivers the mixture by pumping the hand grip 20. The dispenser 22 may be of any size to accommodate the reactive resin components 14.

The method for building in situ a horseshoe 12 of an intended shape 24 includes upturning the hoof 10 for treatment and cleaning the surface 26 of the intended shoe area 28 of the animal hoof of debris. A shoe preform 32 is formed on the shoe area 28 by depositing onto the surface 26 a flowable intimate curable mixture of reactive resin precursors 14 having a suitable depth, e.g. ½ inch, and width, e.g. 1 inch, of profile 30, see FIG. 1A.

Preform profile 30 generally conforms to the intended horseshoe shape 24. Suitably, the mixture 14 self-adheres, as with a urethane resin, or is made to adhere to the shoe area surface 26. The mixture 14 cures in place under any of various cure regimes including moisture, heat, light, catalysts, etc. suitably at ambient temperatures, preferably of 65 to 85 degrees F for the resin system exemplified below. Mixture 14 having the profile 30 of the preform 32 cures to a non-flowable mass 36 by reaction of the resin precursors before substantial portions of the mixture flow from the shoe area surface 26. In some cases the mass 36 is deliberately extended as a skirt 37 to cover the immediately adjacent hoof areas 39 beyond the hoof surface 26.

With further reference to FIGS. 1 and 1A, the reactive precursor mixture 14 is suitably extruded onto the cleaned hoof surface area 26 from a common mix tip 42 comprising extended flights of mix elements as is known and communicating with separate, reactive resin precursors 44, 46 in first and second chambers 16, 18 of the dispenser 22. The flowable horseshoe preform 32 is thus extruded as an intimate, curable mixture of the reactive resin precursors 44, 46, at the above-noted profile 30 depth and width and generally conforming to the intended horseshoe shape 24, Following adhesion and cure to a non-flowable mass 36 that defines the shoe 12 (unfinished), the user locally shapes the horseshoe mass to modify its extruded profile to the final intended horseshoe shape 24 on the surface 26.

Looking now to FIGS. 2, 2A and FIGS. 3, 3A an application of a precoating of resin in advance of a full profile application and an extrusions application of a precoating of resin using a hand-operable dispenser are depicted. Shown are the hoof 10, the shoe 12, the mixture of reactive resin components 14, the applicator 15, the dual chambers 16 and 18, the hand grip 20, the dispenser 22, the hoof surface 26, the shoe area 28, the profile 30, the shoe preform 32, additional mixture 34, the non-flowable mass 36, the mix tip 42, the separate reactive resin precursors 44 and 46, and a thin layer 50, a hand-operable dispenser 52, and a thumb-pressed piston 54.

Figures 3, 3A:
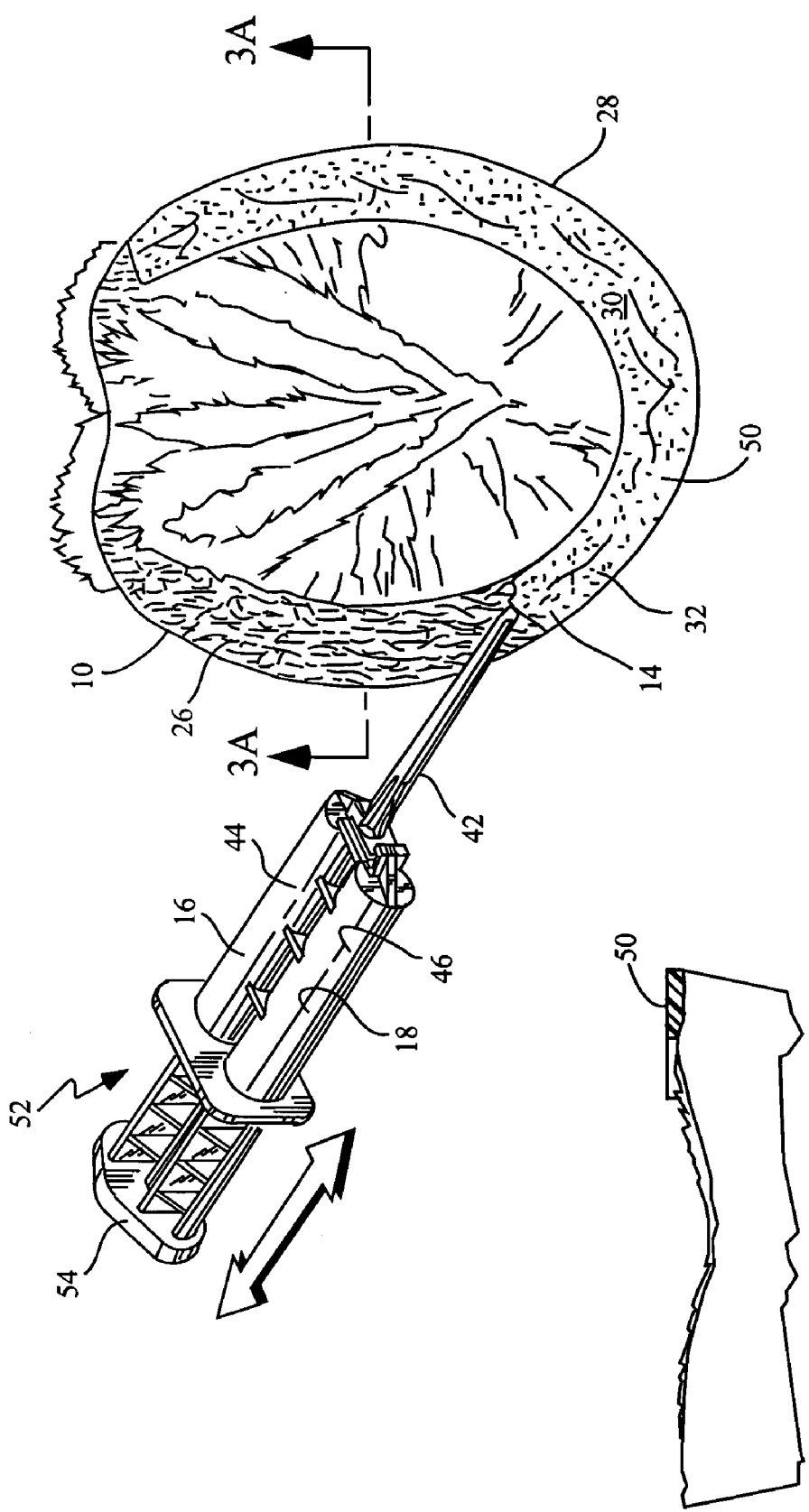
FIG. 3 is a view like FIG. 2 of the extrusion application of a precoating of resin in advance of a full profile application.
FIG. 3A is taken on line 3A—3A in FIG. 3.

In one embodiment there can be a precoating of the shoe area surface 26 with a thin layer 50 of a mixture 14 of reactive resin precursors 44, 46, but having less than 25% and as little as 5 to 15% of the profile 30 depth of the intended horseshoe shape 24. Such a lesser mass of reactants will have a lower exotherm than the full profile depth, assuming the same reactants. The thin layer 50 is at least partially cured before extruding additional mixture 14 onto the thin layer. For delivery of small quantities of resin, a hand-operable dispenser 52 with a thumb-pressed piston 54 shown in FIG. 3 is advantageously used in preference to the large or intermediate size dispenser 22.

Figure 4:
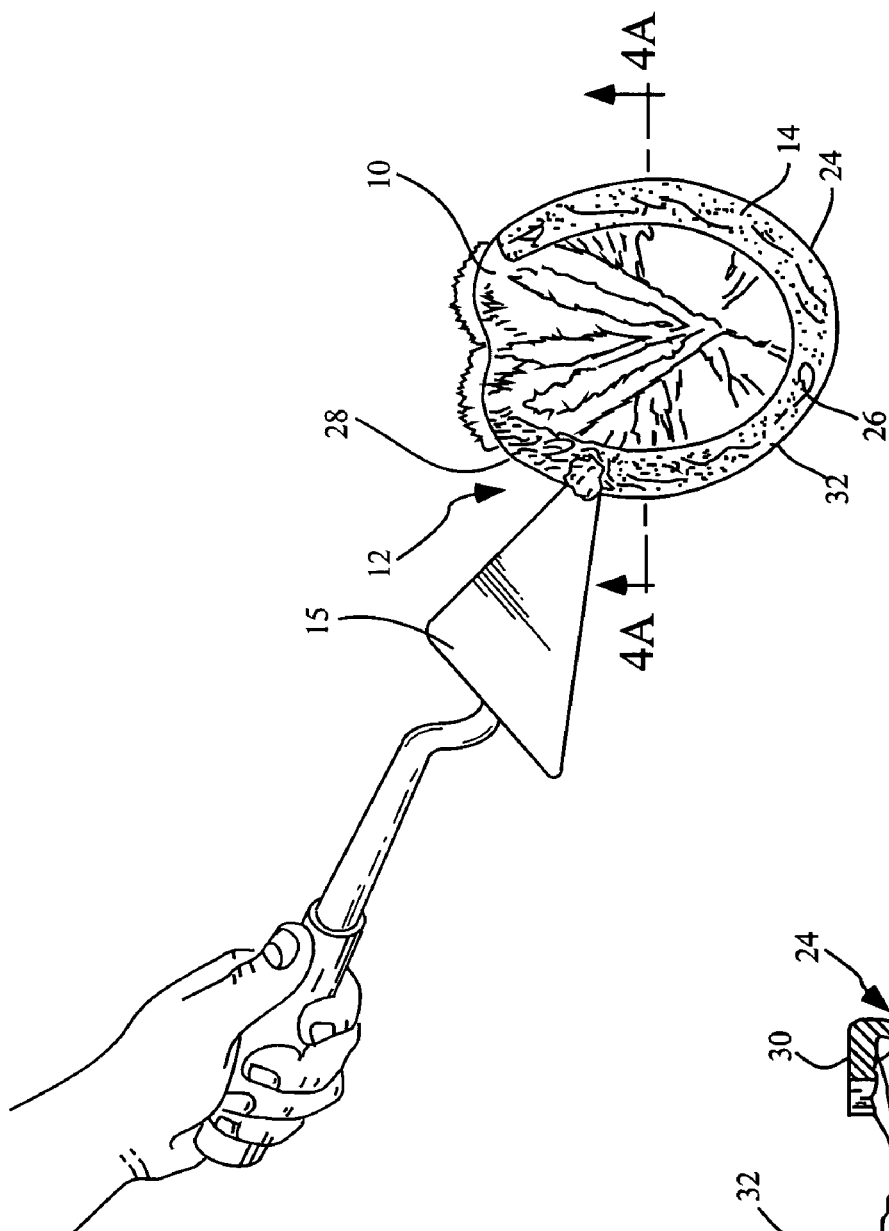
FIG. 4 is an oblique view of the troweling application of a malleable resin mass to provide a horseshoe preform onto a hoof surface.
Figure 4A:
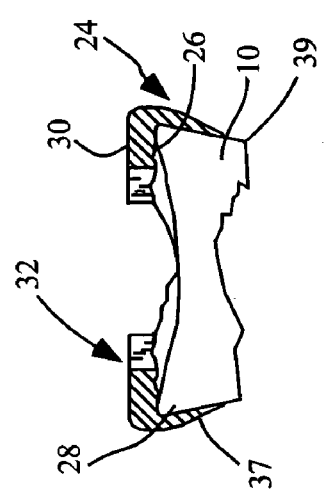
FIG. 4A is taken on line 4A—4A in FIG. 4.

In an alternate embodiment shown in FIGS. 4 and 4A, an oblique view of the troweling application of a malleable resin mass to provide a horseshoe preform onto a hoof surface is depicted. Shown are the hoof 10, the horseshoe 12, a mass 14, a trowel 15, the intended shape 24, the hoof perform 32, the skirt 37, and adjacent hoof areas 39.

The hoof 10 has a surface 26 defining a shoe area 28. Shoe area 28 is provided with a shoe 12 formed immediately on the hoof, i.e. in situ, from a mass 14 of resin deposited from a spatula or trowel 15 onto the shoe area 28.

Figure 6:
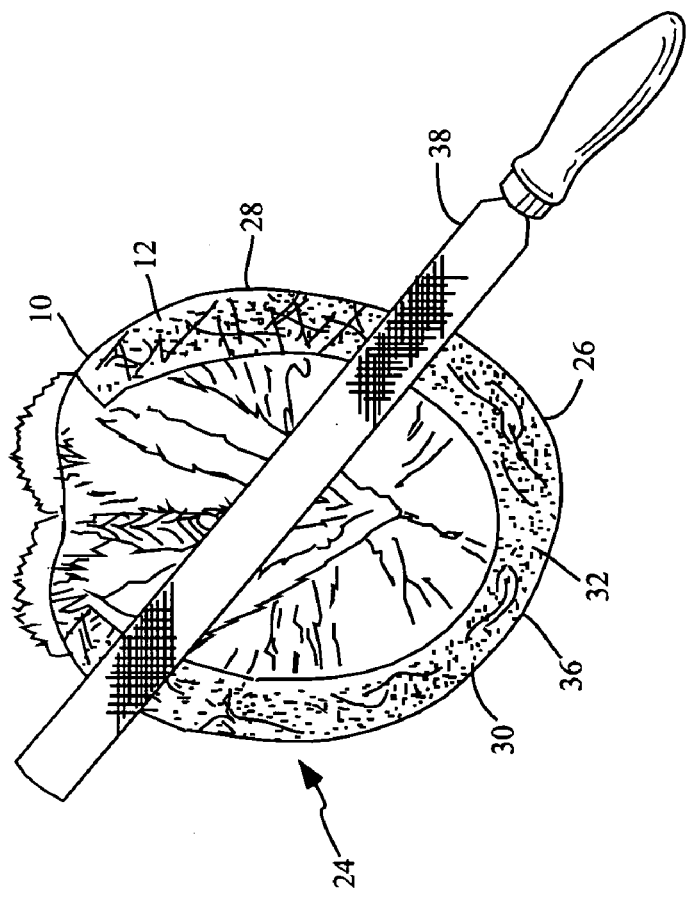
FIG. 6 is a view like FIG. 5 showing further modification of the hoof shoe.
Figure 5:
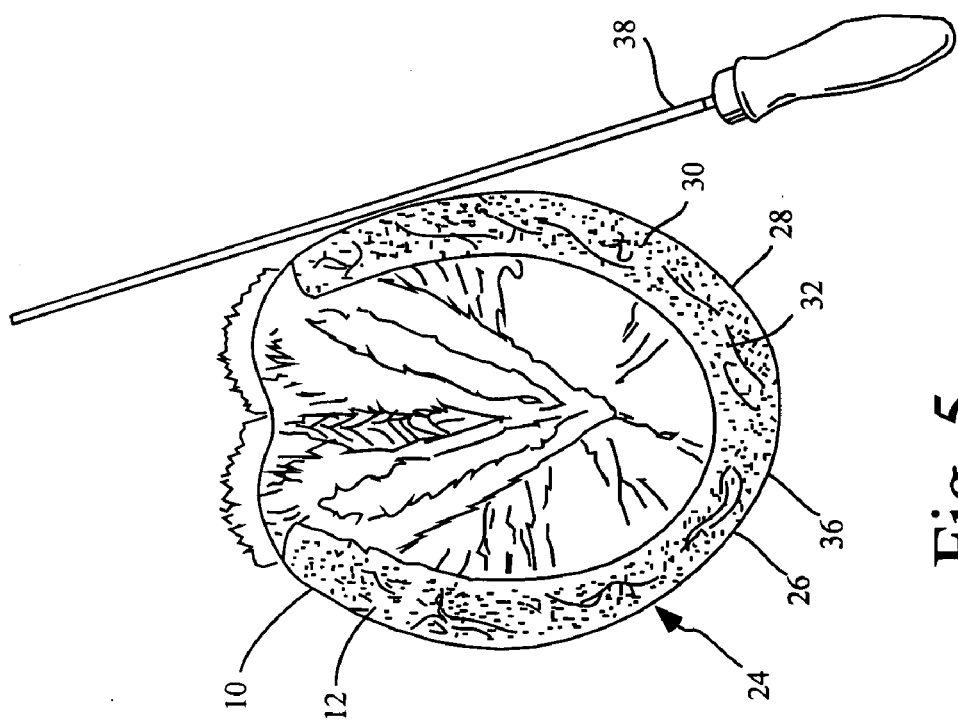
FIG. 5 is a plan view of the cured hoof shoe preform being modified to its intended shape.

The invention method for building situ a horseshoe 12 of an intended shape 24 includes upturning the horse hoof 10 for treatment, and cleaning the surface 26 of the shoe area 28 of horse hoof of debris. A shoe preform 32 is formed on the shoe area 28 by depositing onto the surface 26 a generally malleable mass 14 of resin, shaping the paste-like resin mass into generally a shoe shape (preform 32) having a suitable depth, e.g. ½ inch, and width, e.g. 1 inch, of profile 30, see FIG. 4A. Preform profile 30 generally conforms to the intended horseshoe shape 24. Suitably, the mass 14 self-adheres, as with a urethane resin or is made to adhere through the use of adhesives, to the shoe area surface 26. The mass 14 loses malleability through loss of solvent, cooling in the case of a hot melt resin mass, curing or hardening under any of various regimes including cure by moisture, heat, light, catalyst, etc., suitably at ambient temperatures, preferably of 65 to 85 degrees F for the thermosetting resin system exemplified below. Mass 14 having the profile 30 of the preform 32 can harden or cure to a non-malleable form 36 by the just mentioned processes or by reaction of the resin precursors before substantial portions of the mass 14 flow from the profile 30 shape. In some cases the mass 36 is deliberately extended as a skirt 37 to cover the immediately adjacent hoof areas 39 beyond the hoof surface Following cure (i.e. loss of malleability) the preform may be shaped as shown in FIGS. 5 and 6. Depicted in FIGS. 5 and 6 are the hoof 10, the shoe 12, the intended shape 24, the hoof surface 26, the shoe area 28, the profile 30, the shoe preform 32, the non-flowable mass 36, and tool 38.

After cure (i.e. loss of malleability) which may be accomplished in one or two minutes or faster, such as 30 seconds, the preform 32 is locally shaped with a rasp 38 or other tool to have the intended shoe shape 24 with the surface finish, and perimeter contour desired.

Preferred resins for use with the embodiments described herein (especially with the dispenser systems shown in FIGS. 1–3) are urethane resins. These resins are formed from reactive precursors of diisocyanates, e.g. aliphatic, and preferably aromatic diisocyanates, on one side and polyols, either aliphatic or aromatic polyols, on the other, with other additives that act as coupling agents, such as silanes in amounts from 0.1 to 5% by weight, that extend the polymer chains, add thixatropy, such as and preferably primary or secondary amines, and/or fumed silicas, control reaction rate and thixatropy, such as amines, and/or that catalyze the reaction. Preferred urethane resins include thixatropic compositions having as the side A reactive resin precursor diphenylmethane diisocyanate and as the side B reactive resin precursor polyoxypropylene oxide polyether polyols and meta xylene diamine, a coupling agent such as one or more silanes at about 3% by weight of the reaction mixture, Quadrol, for improved snap set and rasping qualities, and thixatroping agents.

Further details on suitable urethane resins prepared from one or more isocyanates, catalysts, various polyols, and amines are disclosed in U.S. Pat. No. 4,869,400, which is hereby incorporated by reference.

Examples of suitable resin systems are the thermosetting synthetic organic resins formed from A and B sides comprising reactive component precursors of the resin. Such resins cure rapidly, are low in shrinkage, are hard and tough, are formable with tools such as rasps in less than two minutes and preferably, do not have excessive exotherms that might injure or discomfort the animal, and self-adhere to the surface 26. Other resin formulations that set up or cure quickly without animal damaging exotherms, that are tough, that are hoof adherent or adherable to the hoof through intermediary adhesives, and are otherwise suitable are likely candidates for use with the devices and methods described herein. Preferably, the resins are reaction products of reactive precursors that can be mixed and delivered rapidly.

Epoxy, vinyl ester, acrylic, polyester, and other resins formulations that set up or cure quickly without animal damaging exotherms, that are tough, that are hoof adherent or adherable to the hoof through intermediary adhesives, and are otherwise suitable are likely candidates for use in the invention in addition to the urethane resins. Such suitable resin systems herein are resins having the requisite strength and forming properties, preferably have low volatility and odor, and can include, among thermosetting resins, epoxy resins, vinyl ester resins, such as the auto-cure or light-cure resin products of diacrylates, and dimethacrylates of Bisphenol-A ethyloxiate resins, corresponding bis-F resins, the auto-cure or light-cure resin products of acrylic functionality, unsaturated polyester resin oilgomers, including those based on the condensation products of maleic and phthalic anhydrides or acids of glycols, polyester resins in combinations of monomers including-styrene, divinylbenzene, ethyl acrylate, methylmethacrylate, and other acrylates, and auto-curing resins above that are catalyzed by various peroxides and promoted by various amines. Thermoplastics such as polyamides, acrylonitrile butadiene styrene polymers, polycarbonates, polyphenylene oxides, polysulfones, polyphenylene sulfides, and fluoropolymers can be used where the strength and other properties are adequate to horseshoe use.

Preferred polymers for use with the embodiments herein (especially with the trowel application system shown in FIG. 4) are polyurethane polymers. These polyurethane polymers are thermosetting synthetic organic resins formed from A and B sides comprising reactive component precursors of the resin. Such resins cure rapidly, are low in shrinkage, are hard and tough, are formable with tools such as rasps in less than two minutes, preferably, do not have excessive exotherms that might injure or discomfort the animal, and self-adhere to the surface 26. Preferably, these resins are reaction products of reactive precursors that can be mixed simply as reactive resin precursors to an intimate admixture. Preferred urethane resins are formed from reactive precursors of diisocyanates, e.g. aliphatic, and preferably aromatic diisocyanates, on one side and polyols, either aliphatic or aromatic polyols, on the other, with other additives that act as coupling agents, extend the polymer chains, add thixatropy, such as amines, and/or fumed silicas, that catalyze the reaction. Preferred urethane resins include thixatropic compositions having the side A reactive resin precursor diphenylmethane diisocyanate and as the side B reactive resin precursor polyoxypropylene oxide polyether polyols and meta xylene diamine, a coupling agent such as one or more silanes at about 3% by weight of the reaction mixture, Quadrol, for improved snap and rasping qualities, and thixatroping agents.

A better understanding of the present embodiment and of its many advantages may be clarified with the following examples, given by way of illustration.

EXAMPLE 1

A reactive urethane resin mixture typically useful in the invention is prepared from two parts (A and B sides) of equal volume in a suitable vessel such as a bucket, or in a dual cartridge dispenser in which dual pistons on a common yoke extrude the separate reactive components through a manifold and into a mix tip comprising a series of baffles arranged to cut and recombine the mixing materials as they progress through the mix tip. All parts and percentages are by weight:

| Component | Percent |
|---|---|
| Part A | |
| Isocyanate Prepolymer (Rubinate 1660 or MDI) | 78. |
| D.B. Castor Oil | 21. |
| Silane (Silquest A-1310) | 1. |
| Silane A-187 | 2. |
| Part B | |
| Polyol (Multranol 3901) | 54. |
| Polyol (Multranol 4012) | 26. |
| Quadrol (N'N'N'N'-tetrakis(2-hydroxyethyl) or propyl ethylene diamine) | 18. |
| MXDA (1,3-benzene diamino methane) | |
| Catalyst (Coscat 83) | 0.25 |

The reaction mass comprising the above sides mixed together is applied by trowel onto the horse hoof that has been cleaned and otherwise prepared to receive the in-situ horseshoe.

EXAMPLE 2

A fast-gelling, low hardness gel was prepared from a reactive urethane resin mixture comprising two parts of equal volume for dispensing from a dual cartridge dispenser in which dual pistons on a common yoke extrude the separate reactive components through a manifold and into a mix tip comprising a series of baffles arranged to cut and recombine the mixing materials as they progress through the mix tip.

Part A of the mixture comprised (all parts and percentages are by weight):

| Component | Parts |
|---|---|
| Part A | |
| Methylene-bis-dicyclohexane diisocyanate (Desmodur W) | 134 |
| Polyoxy propylene oxide ether polyol, triol (6000 MW) (Multranol 3900) | 192 |
| D.B. (Double Boiled) castor oil | 28 |
| Methylene-bis-diphenyl diisocyanate (Isonate 2143L) | 72 |
| 3-(triethoxysilyl)propyl isocyanate (Silane Y9030) | 24 |
| Part B | |
| Multranol 3900 | 196 |
| Polyoxy propylene oxide ether polyol, diol (2000 MW) (Multranol 3600) | 83 |
| Polyoxy propylene oxide ether polyol, triol (450 MW) (Multranol 4012) | 96 |
| Ethylene diamine tetra propoxylate (Quadrol) | 38 |
| Butanediol, 1, 4 | 17 |
| Bismuth naphthenate (Coscat 83) | 21 |

The first three Side A components were mixed together in a suitable vessel, then the second and third isocyanate components were mixed in, and the mixture put up in a first chamber of a dual chamber dispenser. Viscosity of the Side A composition was in the range of about 1000–2000 centipolises at about 25 degrees Celsius. The Side B components were mixed together without the Coscat catalyst, then the catalyst was added at the indicated high amount (about 5% by weight) and the mixture was put up in the second chamber of the dual chamber dispenser. The Side B viscosity was in the range of about 800–2000 centipoises, also at about 25 degrees Celsius. Importantly, the above Side A and Side B compositions are reactive to a urethane polymer when mixed in a 1:1 ratio, making this composition ideal for dispensing from a conventional 1:1 dual chamber cartridge. Other ratios can be used but they are less convenient, and the cartridge dispensers required, e.g. 2:1 are more costly.

A hoof treatment was effected by simultaneously expelling the contents of both chambers of the dual chamber dispenser through a common mix tip where they were intimately mixed under severe shear conditions into the volume defined by the hoof below the hoof pad. Injection took about 5 seconds. The like viscosities and the 1:1 mix ratio of the example composition make their packaging and dispensing to be readily accomplished. The sides react in the mix tip and within the hoof volume. The low viscosity of the mixed components enables the ready and rapid filling of the small interstices in the hoof wall. The mixture, however, after a working time of about 8 to 12 seconds, gels very rapidly, within about 20 seconds, so that the mixture remains disposed within the hoof volume. The farrier can put the hoof down after this brief gelling time, as the composition is adhered to the hoof wall, the web across the void, if used, and will not drop or squeeze out. The composition is solid and free of voids, cellularity and foam structure, but provides the desired cushioning effect noted above. The gelled resin was translucent to clear. Typical hardness values for the fully gelled composition are in the range of Shore A 40 to 80 after 24 hours at room temperature; thus hoof cushioning is achieved without a foamed compositions.

The formulations, methods, and devices described herein maybe used interchangeably as desired to create a custom hoof device for any hoofed or clawed animal, depending on the needs of the animal therein. For example, the same material that may be used to produce in situ hoof shoes may be used to produce pre-molded hoof shoes. Likewise the material used to fix a damaged hoof may also be used to prophylactically treat a healthy hoof.

All references cited herein are hereby incorporated by reference.

What is claimed is:

1. A method for building a horseshoe of an intended shape in situ, including cleaning the surface of the shoe area of a horse hoof of debris, but not otherwise substantially altering said hoof, shaping a temporarily generally malleable mass paste-like resin, which is free of voids, in situ on the cleaned hoof surface into generally a solid horseshoe-shape limited to the bottom of the substantially unaltered hoof, and locally modifying exposed surfaces of said horseshoe shape on said shoe area surface after general malleability in the resin is lost.

2. A method for building a horseshoe of an intended shape in situ, including cleaning the surface of the shoe area of a horse hoof of debris, but not otherwise substantially altering said hoof, collecting an unconfined malleable paste-like resin mass, which is free of voids, applying said mass onto the cleaned hoof surface and forming said mass into a generally solid horseshoe-shaped form in situ limited to the bottom of the substantially unaltered hoof with a tool having exposed surfaces, and then locally modifying the exposed surfaces of said mass to conform said exposed surfaces to said intended shape on said shoe area surface.

3. A method for building an animal shoe of an intended shape in situ, including cleaning the surface of the shoe area of debris but not otherwise substantially altering said hoof; depositing onto the cleaned substantially unaltered hoof surface a flowable shoe preform comprising a malleable paste-like resin mass free of voids and having a depth and a width of profile generally conforming to said intended shape in said shoe area, reducing said mass in situ to a solid, non-flowable state to retain all of said mass on said bottom surface of the shoe area, and then locally mechanically modifying said mass to modify with a tool its profile to conform to said intended shape on said shoe area surface.

* * * * *

UNITED STATES PATENT AND TRADEMARK OFFICE
CERTIFICATE OF CORRECTION

PATENT NO. : 7,124,832 B2  Page 1 of 1
APPLICATION NO. : 10/719864
DATED : October 24, 2006
INVENTOR(S) : Kelly It is certified that error appears in the above-identified patent and that said Letters Patent is hereby corrected as shown below:

Claim 1, column 10, line 45, after "debris" delete "," (comma).

Claim 2, column 10, line 55, after "debris" delete "," (comma).

Claim 3, column 10, line 66, delete "hoof;" (semicolon) and insert --hoof,-- (comma).

Signed and Sealed this

Third Day of April, 2007

JON W. DUDAS
*Director of the United States Patent and Trademark Office*